June 22, 1948.   E. A. ROCKWELL   2,443,642
ELECTRICAL HYDRAULIC POWER UNIT
Filed May 6, 1944   6 Sheets-Sheet 6
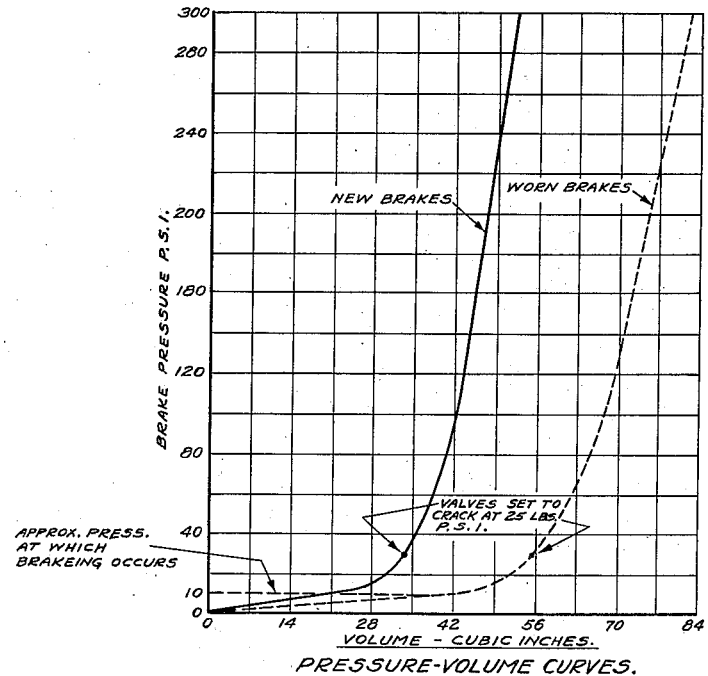
PRESSURE-VOLUME CURVES.
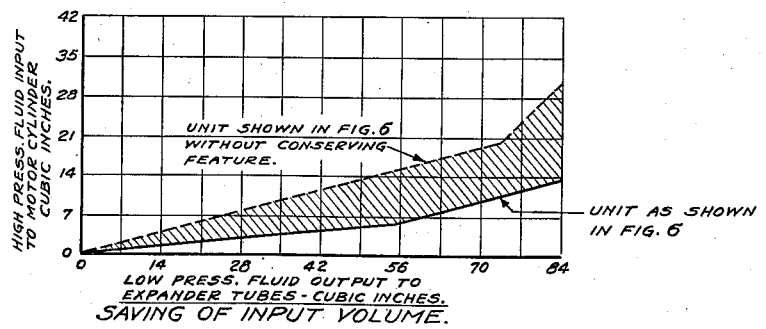
SAVING OF INPUT VOLUME.
Inventor:
Edward A. Rockwell Patented June 22, 1948

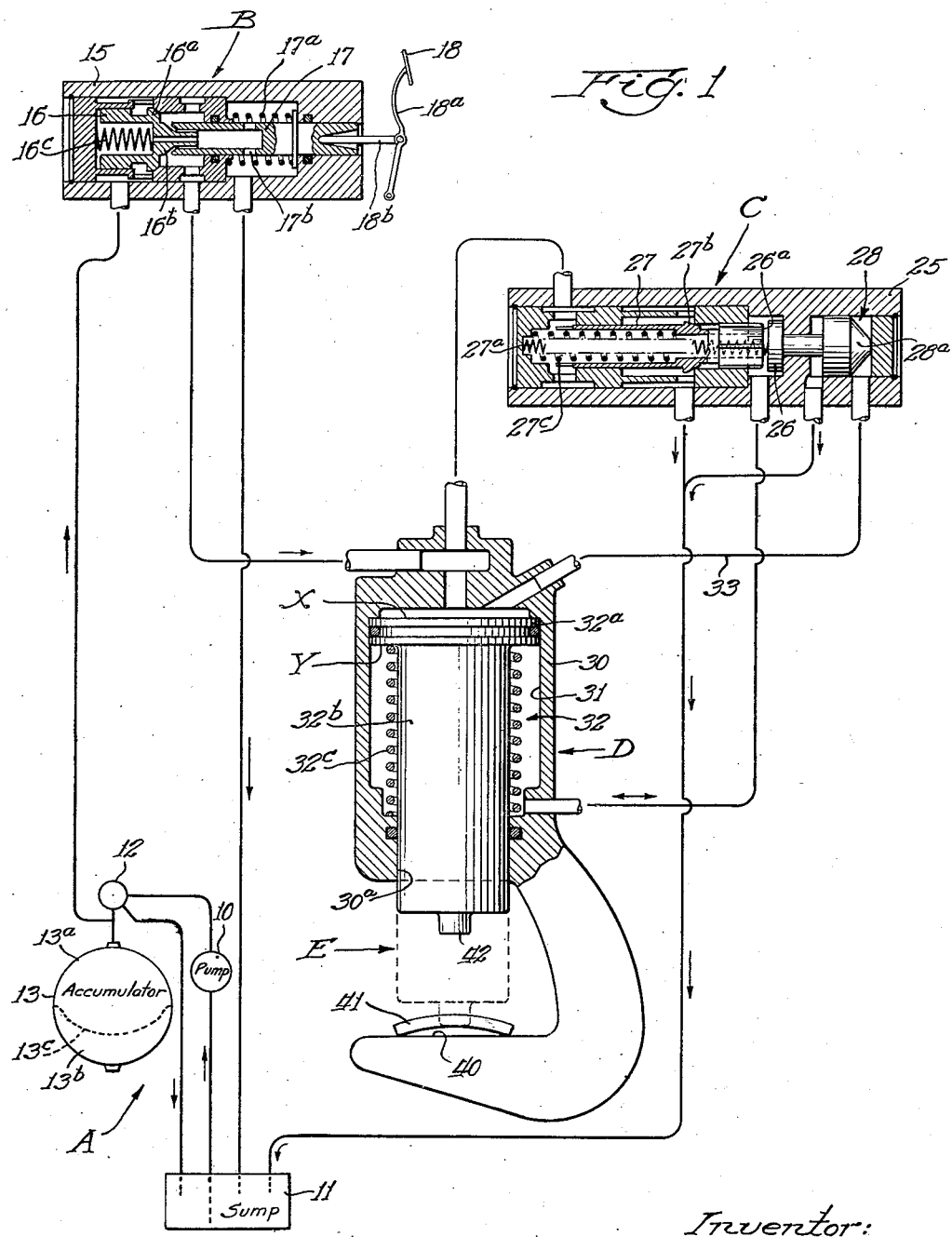

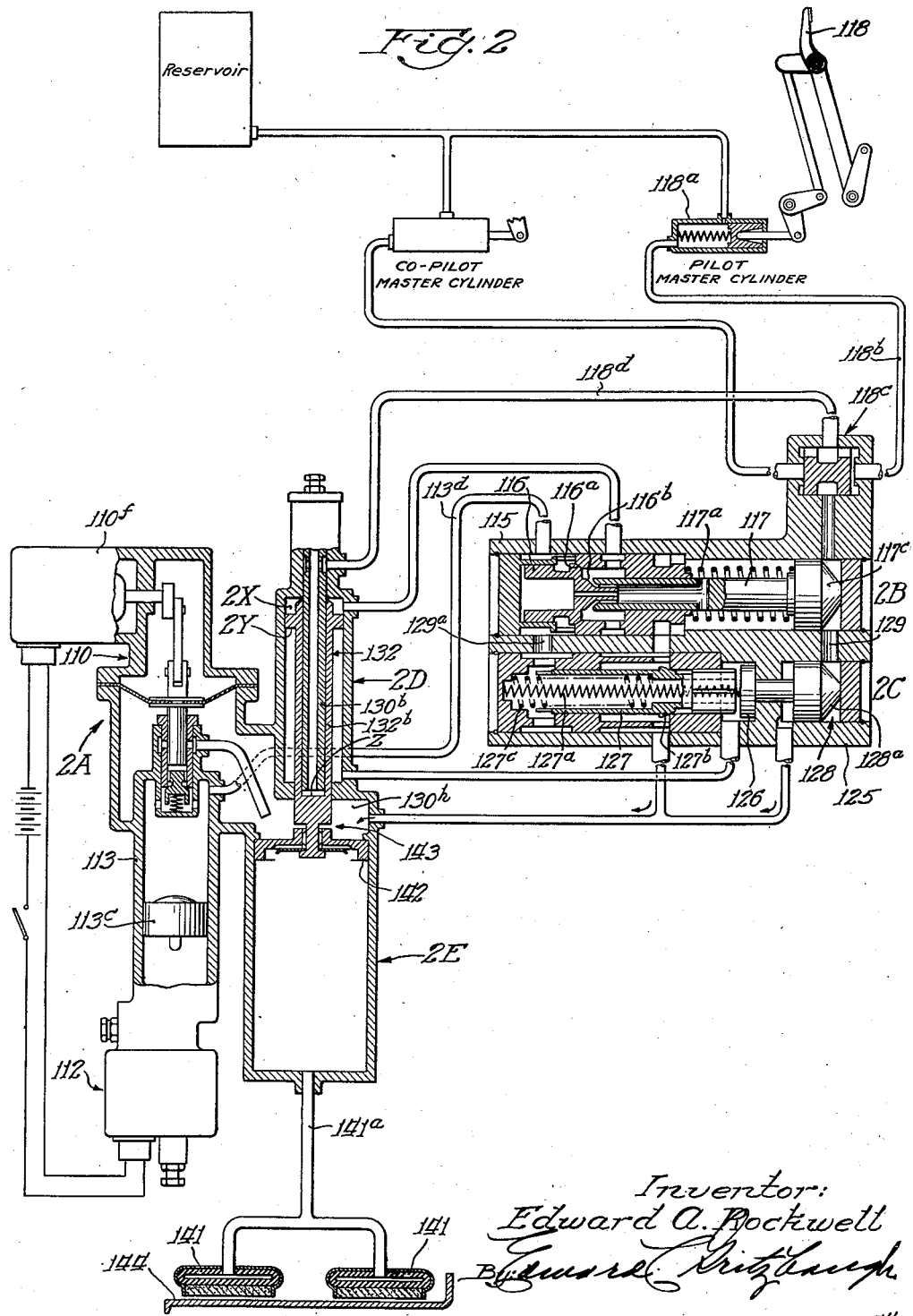

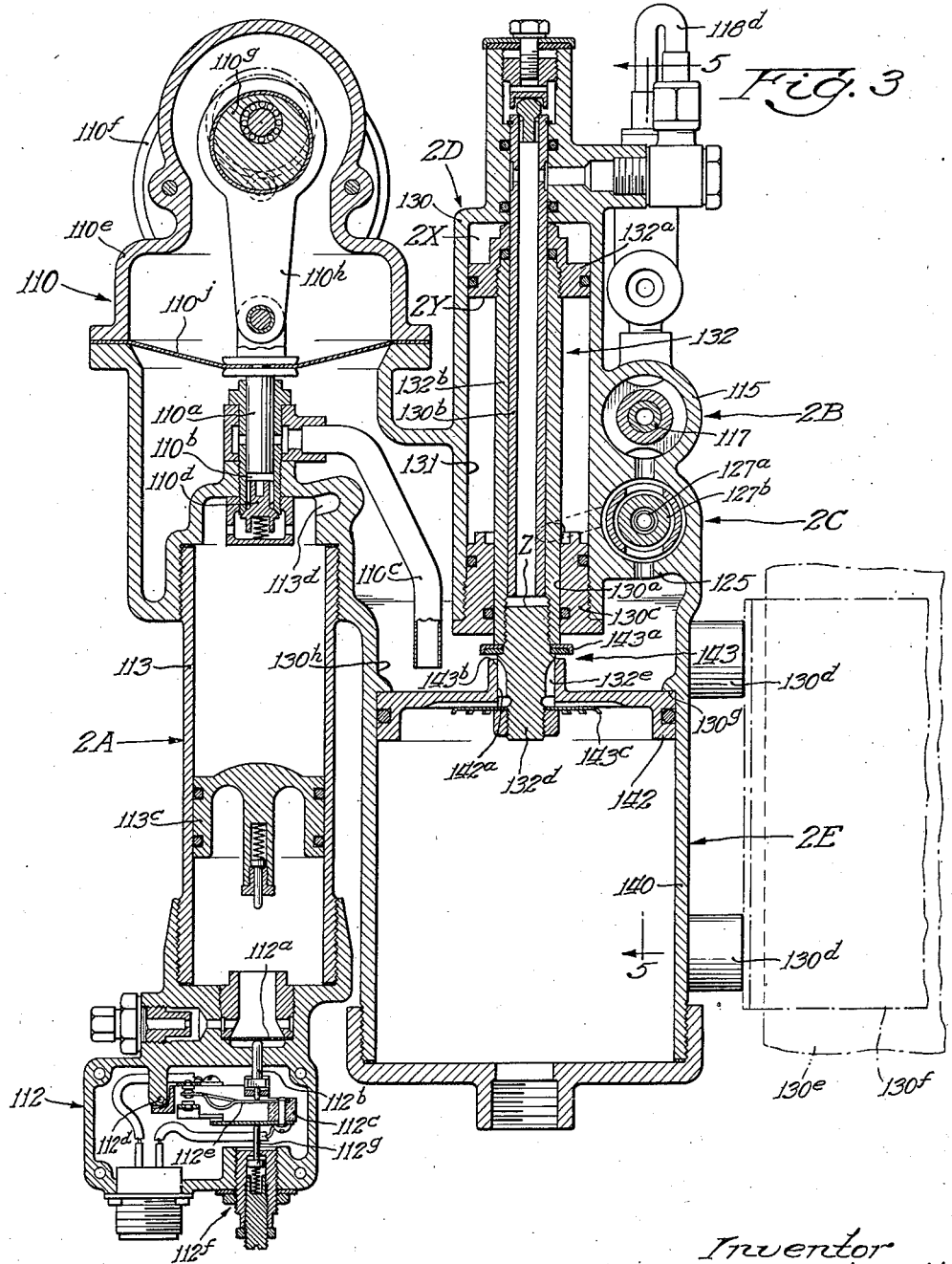

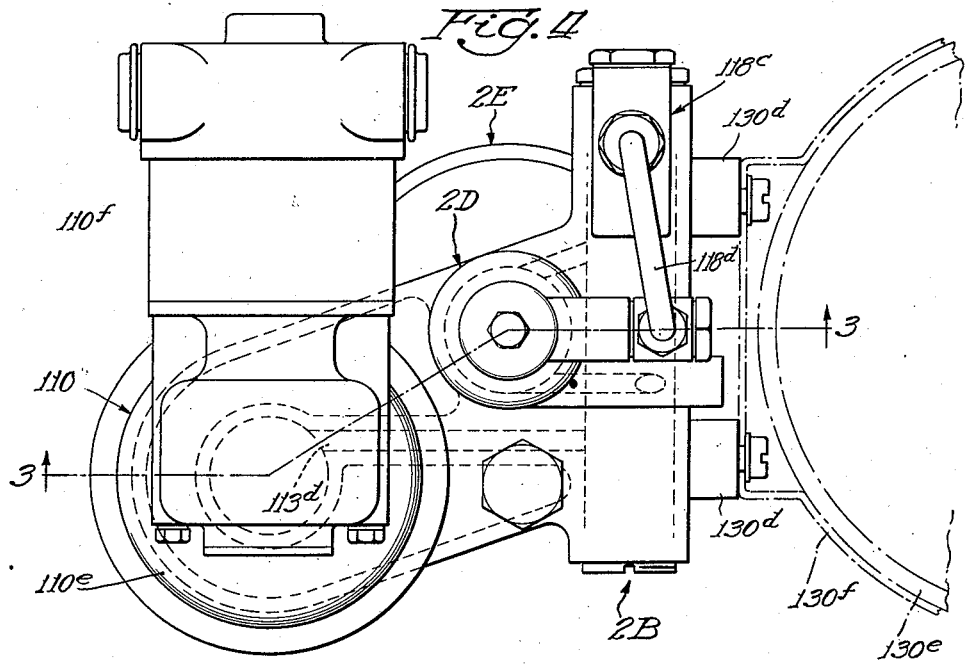
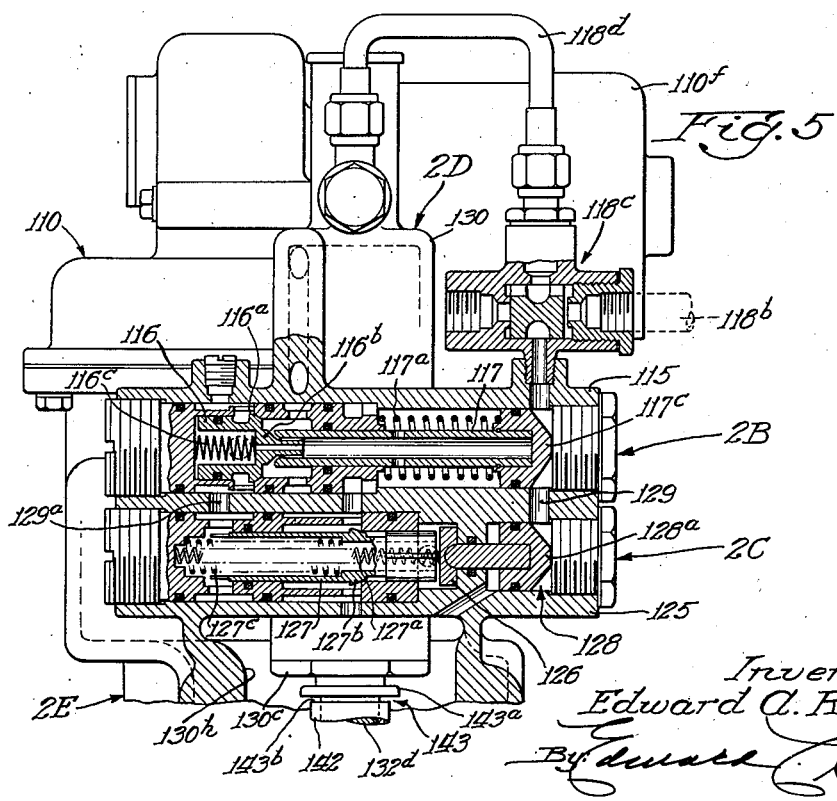

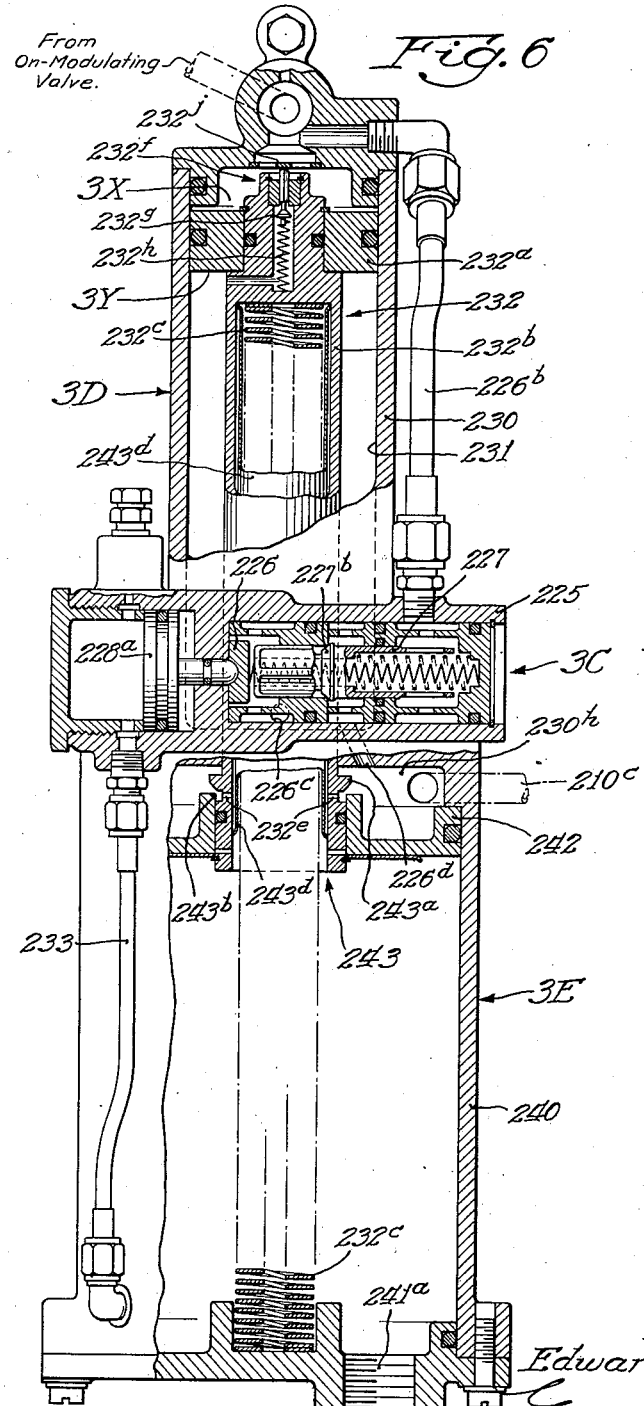

2,443,642

UNITED STATES PATENT OFFICE 2,443,642

ELECTRICAL HYDRAULIC POWER UNIT

Edward A. Rockwell, Cleveland, Ohio, assignor, by mesne assignments, to Borg-Warner Corporation, Chicago, Ill., a corporation of Illinois Application May 6, 1944, Serial No. 534,503

5 Claims. (Cl. 244—111)

The present invention relates to power units generally and particularly to units having application to the operation of airplane and automotive parts and accessories. While this invention was made in solving certain problems involving airplane brakes, as will appear, it is to be understood that in the broader aspects thereof, the same has general application.

A large number of current airplane designs employ an expander tube type of brake motor and these tubes are frequently used in groups of as many as four on each wheel. It is found that these expander tubes may require as much as 40–45 cubic inches of pressure fluid displacement for merely taking up the slack and bringing the brakes into contact with the brake drum, especially when the brakes have become worn. However, during this initial displacement, that may be referred to as the "engaging stage," the pressure necessary to expand the tubes and the brake blocks against the drums will not ordinarily exceed more than about 10 pounds per square inch. On the other hand, to set the brakes the desired maximum amount, which action may be referred to as the "squeeze stage," there may be required as much as 280–300 pounds per square inch, and during this time the expander tubes may be additionally expanded about 42–45 cubic inches, consuming a corresponding amount of additional pressure fluid. In typical systems currently in use high pressure fluid is employed in the first stage operation in a manner that unnecessarily wastes a large amount of high pressure fluid in merely bringing the expander tubes and brake blocks into engaging position where the brakes are just beginning to be applied.

These current systems consume a relatively large volume of high pressure fluid for the "application stage" as well as the "squeeze stage" and hence require a relatively heavy large capacity electric motor and pump combination, a large pressure accumulator, a reserve tank, a pressure switch arrangement to control the electric motor, and suitable modulator valves operated by the pilot and co-pilot. Such systems necessarily involve a large amount of heavy tubing and connections, it being impracticable to locate the power plant in close proximity to the work to be performed, due to weight and space requirements thereof.

It is a principal object of my invention to provide an improved power unit and control therefor effective to greatly reduce the volume of high pressure fluid required to be consumed in the operation thereof and hence reduce the weight and space requirements of the system. A more particular object of my invention is the provision of a self contained unitary power assembly or packaged power unit that is powerful, efficient in its consumption of pressure fluid, and hence of relatively light weight, which unit may be readily placed in any desired location in proximity to the work to be performed and which requires only a light weight remote control connection to the operator or pilot for remotely controlling the same, all of the elements being so arranged within the unit that all thrust is taken within the unit and no thrust is transmitted externally thereof to the support on which the same is mounted.

Another specific object is the application of the above arrangement to the operation of brakes on the landing wheels of an airplane, including the provision of a power unit that may be placed in any desired location and attached to the plane as a unit or as a single packaged assembly. An example of such unit is one that is adapted for mounting on the landing gear strut in close proximity to the wheel brakes. Such arrangement and location has the advantage that the structural elements of the unit provide for the quick and effective transfer of a large volume of relatively low pressure hydraulic fluid the short distance involved, while only consuming a small volume of relatively high pressure fluid for accomplishing both the setting or "engaging stage" and the subsequently required actual brake applying or "squeeze stage." Another detailed object is the provision in one modification of my invention, of a power unit of the above type providing power release of the brakes for fast action as distinguished from the usual arrangement wherein a stiff spring is relied upon to effect return movement resulting in a corresponding inefficiency of brake application.

A further object is the provision in a "packaged unit" of the above type of a modulator valve assembly in combination with a power applying motor piston assembly having differential pressure areas, said valve assembly being effective to control the application of pressure fluid thereto and the release of pressure fluid therefrom in a manner such as to conserve the high pressure fluid, resulting in a large saving in the total power requirements with an accompanying reduction in the weight of the complete unit, whereby it is made practicable to locate the unit adjacent the work to be performed or on the device to be operated and to effectively and efficiently control the unit from a remote position.

It is still another object to provide in a unitary assembly of the above character, an improved hydraulic control arrangement for transmitting manual pressures from the remotely located operator or pilot and co-pilot control devices to the modulating valves.

Still another object is the provision in the present combination of an electric motor and reciprocating pump unit of a diaphragm seal arrangement effective to eliminate loss of fluid from the device in all positions thereof accompanying maneuvering of the associated airplane, as well as the movement of the elements to which the power unit may be attached.

Further objects, advantages and uses of my invention will become apparent from a reading of the following specification taken in connection with the accompanying drawings which form a part thereof and wherein:

Fig. 1 is a schematic layout view of a simplified typical system incorporating certain of the broad features of my invention;

Fig. 2 is a schematic layout view of a modified system incorporating certain of the features of my invention;

Fig. 3 is an enlarged elevational view in section showing in more detail the power unit proper of the modification of Fig. 2;

Fig. 4 is a plane view of the unit shown in Fig. 3;

Fig. 5 is a broken away sectional view taken substantially on the line 5—5 of Fig. 3;

Fig. 6 is a broken away axial section view of a third modified form of my invention;

Fig. 7 shows a set of curves based on data taken from the operation of a unit conforming with Fig. 6; and Fig. 8 shows a pair of curves bringing out a comparison between the data obtained by the operation of the unit of Fig. 6 with and without the staging feature of the present invention.

To facilitate an understanding and comparison of the structures of the several modifications, similar designating numbers and letters will be employed insofar as practicable, differing only in the first number for the purpose of differentiating modifications. For example, the power applying motor of the first modification is designated D, that of the second modification 2D and that of the third modification 3D. The piston of motor D in the modification of Fig. 1 is designated $32a$ while that of the second modification is designated $132a$, and that of the third modification $232a$.

Referring now to Fig. 1 of the drawings, there is illustrated in simplified, schematic form, one typical system incorporating a preferred embodiment of certain of the broad features of the present invention. This system is composed essentially of a hydraulic pressure fluid generating and storing assembly indicated generally at A, pressure fluid on-modulating valve B, transfer and off modulating valve C, hydraulic pressure fluid power applying motor assembly D, and work performing assembly indicated generally at E.

The present invention, in its more specific aspects, is directed particularly to the construction, the arrangement and to the mode of coaction of on-modulating valve, transfer and off modulated valve, and power applying motor assembly, in the several modifications illustrated by way of example and their equivalents, whereby to provide "stage" operation. In the broader aspects of my invention, it will be understood that other equivalent arrangements may be provided coming within the scope hereof. In other words, there is provided, by way of example in Fig. 1, one arrangement for effecting a first or "engaging" stage of movement of motor D at a relatively low power and low rate of consumption of pressure fluid and a second or "squeeze" stage at a higher intensified power and relatively higher rate of pressure fluid consumption. The first stage is effective to take up slack and perform any desired portion of the work up to a selected level of power application whereupon the second stage is cut in automatically in a novel manner which effects a smooth imperceptible transition for accomplishing the final portion of the work. Since the extent of travel during second stage operation is usually relatively small the additional consumption of high pressure fluid during this stage operation is relatively small.

Hydraulic pressure fluid generating and maintaining assembly A, may include a pressure generator 10 delivering pressure from a sump tank 11 through a conventional unloading valve 12 to a pressure accumulator 13. Pressure generator 10 may be driven continuously as when connected to the power output shaft of an internal combustion engine (not shown) or driven by an electric motor (not shown) continuously or interruptedly. Loading and unloading valve 12 may take the form of any of the well known readily available constructions effective to maintain hydraulic pressure fluid in accumulator 13 between selected maximum and minimum levels of pressure. Pressure accumulator 13 may take any well known form, including for example, a pair of hemispherical sections $13a$ and $13b$, the interior of which is divided by a diaphragm $13c$ into a hydraulic pressure chamber and an air chamber.

On-modulating valve B may take any well known form, but is preferably of the type disclosed in Rockwell Patent 2,276,418 and includes essentially a housing 15 enclosing balanced high-pressure inlet valve 16, cooperating with seat $16a$ and having a relief or return valve portion $16b$, valve 16 being normally urged into engagement with seat $16a$ by a compression spring $16c$. A reciprocable tubular sleeve 17 is formed at one terminal with a valve seat for valve $16b$, and with radial low pressure return ports $17b$ intermediate the terminals thereof. A compression spring $17a$ normally urges reciprocal tubular valve element 17 in the direction out of engagement with valve $16b$ and a manually engageable pedal 18 is operable through levers $18a$ and link $18b$ to move tubular valve element 17 into engagement with valve $16b$ against the action of spring $17a$ to effect opening of on-modulating valve proper 16 and the modulated introduction of high pressure fluid from the accumulator past valve seat $16a$ to motor assembly D and transfer and off modulating valve assembly C. Relaxation of the pressure on manual pedal 18 results in spring $17a$ moving valve sleeve 17 out of contact with conical valve $16b$, permitting inlet valve 16 to close against seat $16a$ and allowing the fluid to be discharged from the motor assembly D through the interior of tubular valve element 17 and radial port $17b$ thereof back to sump 11.

Transfer and off modulating valve assembly C is, in some respects, similar in construction to on-modulating valve B, certain parts being reversed as will appear. Housing 25 contains a reciprocable transfer valve 26 engageable with a seat $26a$ at the end of the fluted terminal of a tubular off modulating valve stem 27, but normally held open by a compression spring $27a$. Tubular valve stem 27 is formed on the periphery thereof with an off modulating valve $27b$, engageable with a complementary seat carried by the housing and is normally urged into engaged position by a compression spring $27c$. It is important to note that since the transfer valve 26 is normally urged into open position by compression spring $27a$ pressure fluid is directed therethrough to surface Y during the first stage operation as will appear. For the purpose of moving valve 26 into engagement with seat 26a against the action of spring 27a and effecting the opening of off modulating valve 27b, there is provided a fluid pressure responsive motor 28 including a piston 28a and a connecting link 28b, passing through a partition in the housing 25 and drivingly engaging valve 26, the motor 28 being supplied with operating fluid pressure through a special control line as will appear.

Hydraulic pressure fluid power applying motor assembly D comprises essentially a housing 30 formed with a cylinder 31 receiving a reciprocable piston and plunger assembly 32 including piston 32a receiving modulated pressure from on-modulating valve B in contact with the upper major working surface X thereof and the same pressure directed through transfer and off modulating valve C to a small opposed differential working surface Y during initial pressure fluid application, with transfer and off modulating valve C in open position as shown, during the first stage of operation that may be referred to as the "engaging stage." This relatively smaller differential area Y is defined in part by plunger 32b which passes through an orifice 30a in the housing 30. Compression spring 32c is effective to return piston assembly 32 to the off position thereof upon the release of pressure fluid from contact with piston 32a. The necessary sealing rings are employed as indicated to prevent leakage of the fluid past the piston and plunger.

It will appear that by virtue of the differential in area between opposed surfaces X and Y, the delivery of the same pressure to both surfaces will be effective to move the power applying piston assembly 32 and thereby deliver a first relatively low level of power for the "first" or "engaging stage."

Particular attention is drawn to the fact that as piston 32a is moved outwardly, pressure fluid in contact with the smaller differential area Y is transferred back through transfer and off modulating valve C and thence into contact with opposed larger differential area X of piston 32a. This is made possible by the fact that valve 26 is held open by spring 27a during the first stage operation. Thus it will be seen that a major economy in the consumption of high pressure fluid is accomplished during the first stage of operation by transferring the pressure fluid in contact with relatively smaller differential area Y through the transfer off modulating valve C to major working surface X of piston 32a. Therefore only just sufficient high pressure fluid from accumulator 13 is required to be consumed to displace a volume equal to the difference in the areas of surfaces X and Y multiplied by the distance of travel of the piston during the engaging stage. This is a relatively small volume of high pressure fluid and a considerable saving of high pressure fluid is thus realized.

The value of the differential between the areas X and Y may be varied to suit the particular installation.

For the purpose of amplifying the power output of motor piston assembly 32, the pressure fluid in contact with the relatively small differential area Y is shut off from communication with the on-modulating valve pressure and placed in communication with the sump tank 11 by the automatic operation of transfer and off modulating valve C, upon the occurrence of a selected delivery pressure to major working surface X. To this end a pressure control line 33 places the modulated delivery pressure fluid, which is in contact with differential area X of piston 32a, also in communication with pressure fluid responsive motor 28a of transfer and off modulating valve C. Therefore, when the pressure fluid modulated to surface X of piston 32a rises to a selected value as determined by the adjustment of spring 27a of transfer and off modulating valve C, then valve motor piston 28a becomes effective to shift valve 26 into contact with seat 26a shutting off communication of fluid pressure from on-modulator valve B, and stopping delivery thereof to differential surface Y. Still further movement of transfer valve 26 becoming effective to open off modulating valve 27b off modulating pressure fluid from contact with smaller differential surface Y and returning the same to the sump tank 11, thus rendering the complete area of surface X effective in response to pressure delivered from on-modulating valve B, providing an intensified application of pressure to piston assembly 32 for a final or "squeeze stage" of operation.

For the purpose of illustrating the general application of the present multi-stage operation comprising my invention, the work performing assembly E is shown as comprising an anvil 40 receiving a distortable work piece 41 engageable by a die member 42 carried by the lower terminal of power plunger 32b. The first stage of operation may bring the die 42 into contact with the work piece 41, distort the same into substantially flat engagement with the anvil 40 and if desired, perform a certain portion of the complete distorting or shaping operation, this being followed, upon the delivery of a predetermined modulated pressure into contact with major work surface X, by the operation of transfer and off modulating valve C effecting a further amplified pressure of die 42 against the work piece 41, to accomplish the final desired distortion or shaping thereof.

From the above, it will appear that in one of the broader aspects of the present invention, the same comprises essentially the delivery of pressure fluid to a pair of opposed differential surfaces of a motor, said differential being effective to produce a first level of power, the pressure fluid in contact with the lesser surface being transferred to the greater surface during the first or "engaging stage" of operation to thus conserve the total amount of pressure fluid consumed, this first stage operation being followed by shutting off of communication of the pressure source with the smaller surface and off modulating of the pressure from the smaller surface to the low pressure return to thus render the major surface more effective and provide an amplified power application or "squeeze state."

This broader aspect of the present invention should not be limited to the specific arrangement of values or other means provided for effecting the above described delivery of pressure fluid to and removal from the differential surfaces, as other modifications may suggest themselves in the light of the present disclosure. The thing of broad importance is the circulating or delivering back of the operating pressure fluid from the leading surface Y to the trailing surface X during the first stage thus effecting a major economy followed by off delivery from the leading surface Y to a low pressure zone during the second stage. For example, if the operating liquid were manually generated by a master cylinder, instead of modulated from an accumulator, then this economy or advantage might take the form of reduced pedal travel.

Particular importance is directed to the smooth imperceptible transition from the engaging stage of power application to the squeeze stage of power application. This improvement is directly attributable to the off modulating of pressure fluid from the smaller surface Y. This is to be clearly differentiated from the producing of a transition by introducing pressure fluid successively into contact with additional surface areas acting in the same direction. This latter arrangement invariably produces "bumpy" or clearly detectable rough operation upon transition between stages.

Turning now to an alternative modification, there is shown in Figs. 2 through 5 a power unit arrangement suitable for incorporation on an aircraft where the reduction of over-all weight and maintenance of high efficiency is a major problem. By employing my novel high-pressure fluid conserving arrangement, it has been made possible to so reduce the over-all weight of a complete power unit and large volume low pressure generator that the complete unit may be mounted on the "oleo" or landing strut of an airplane and function to quickly deliver low pressure, large volume pressure fluid for the operation of the expander tube brake on the associated landing wheel.

In this modification, hydraulic fluid pressure generating and maintaining assembly 2A comprises a reciprocating plunger generator pump 110 delivering to an accumulator 113 in which a range of pressures is maintained between selected maximum and minimum values by means of a pressure responsive switch assembly 112, effective to cut the driving electric motor on and off depending upon the level of pressure. A piston 113c divides accumulator 113 into an upper hydraulic pressure fluid chamber and a lower air pressure chamber, the accumulator being in the form of a cylinder providing for the shifting of piston 113c with changes in pressure on the opposite sides thereof.

Pressure fluid generator assembly 110 comprises essentially a reciprocable plunger 110a operable in cylinder 110b receiving low pressure fluid through swiveled pickup tube 110c and discharging pressure fluid through check valve 110d into the upper portion of accumulator 113. The pump housing 110e enclosably supports an electric motor 110f driving an eccentric 110g, operating a reciprocating connecting rod 110h, drivingly associated with the pump plunger 110a through a diaphragm 110j. This diaphragm is sealably associated with the housing about the periphery thereof and performs the important function of preventing the fluid from leaking therepast irrespective of the angular position of the equipment due either to movement of the supporting strut or the manipulation of the plane.

On modulating valve 2B and transfer and off modulating valve 2C are formed as a unit and are incorporated in the upper portion of housing 130 of power applying motor assembly 2D adjacent cylinder 131 (Figs. 3 and 5). The construction of modulating valves 2B and 2C is essentially the same as that of modulating valves B and C except as will be pointed out. Tubular valve element 117, instead of being operated directly, is arranged to be operated remotely by the pilot. Tubular valve element 117 is provided with a fluid pressure responsive motive piston 117c to which is delivered hydraulic pressure from a pilot actuated master cylinder 118a operated by the pilot through treadle 118 and effective to transmit control pressure through conduit 118b. Duplicate treadle controls are shown for the pilot and co-pilot, double check valve 118c being effective to prevent operation by one master cylinder when the other has already been operated. Piston 128a of transfer and off modulating valve operating motor 128, instead of being made responsive to the pressure delivered to the power applying motor 2D, as in the modification of Fig. 1, is made responsive to the control pressure delivered from the pilot's control treadle 118. This motive piston 128a is placed in communication with the motive piston 117c through passage 129 in off modulating valve housing 125. Pressure fluid is delivered from the accumulator to on-modulating valve 116 and also by means of a passage 129a, is delivered to transfer and off modulating valve 2C. Valve 126 of transfer and off modulating valve assembly 2C, being in open position full accumulator pressure is delivered to the smaller differential area 2Y of pressure fluid power applying motor 2D and this functions to produce pressure return of the motor to off position thus making possible the elimination of a return spring. This is distinguishable from the arrangement of the modification shown in Fig. 1, wherein the motor is returned to off position by means of coil compression spring 32c.

Hydraulic pressure power applying motor arrangement 2D is similar to that of motor D in the modification of Fig. 1 except as will be pointed out. Piston and plunger assembly 132 comprises a separable piston 132a threadably secured to the upper terminal of tubular plunger 132b. Depending from housing 130, is a fixed travel coordinating monitor plunger 130b, sealably and telescopingly receiving motor plunger 132b and piston 132a for reciprocation thereon. Motor plunger 132b passes through an orifice 130a in orifice closure plug 130c. This closure plug is externally threaded for reception within the lower terminal of cylinder 131. The lower terminal of motor plunger 132b is closed by a threaded plug 132d. The interior of monitor plunger 130b is placed in communication with the pilot master cylinder 118a through conduits 118b and 118d. The pressure exerted by the pilot through treadle 118 and master cylinder 118a is transmitted through monitor plunger 130b to the closed terminal of motor plunger 132b acting on surface Z of closure plug 132d. Therefore, the effort exerted by the pilot on treadle 118 is transmitted in the form of work to surface Z and the pilot thus performs a definite though small proportion of the work in moving the motive piston and plunger and this gives the pilot the desired reaction simulating actual manual brake application. In addition, as power applying piston 132a moves with reference to the monitor plunger 132b, the effect thereof evidences itself to the pilot by a corresponding travel of treadle 118. Thus the pilot experiences a pedal feel and travel which is the same as if he were actually applying the brake with his foot.

The work applying or power consuming assembly 2E, in this modification, is a low-pressure relatively large volume pressure fluid generating cylinder 140, having the function of supplying pressure fluid through a short conduit link 141a to the expander tubes 141 of an airplane wheel brake, the drum of which is indicated schematically at 144. It will be noted that this type of airplane brake requires a relatively large volume of pressure fluid at a relatively low pressure, it being important that the fluid be delivered thereto quickly as well as relieved therefrom quickly. In currently employed arrangements wherein the low pressure fluid generator must necessarily be located at a considerable distance away from the expander tube, it is very difficult, if not impracticable to obtain this rapid delivery and release of relatively low-pressure, large volume of fluid. Due to the excessive over-all weight of currently employed systems, the same are not capable of being mounted in close proximity to the wheel brake. On the other hand, by virtue of the economy and efficiency realized by my system, it is made practicable to mount the entire unit as a package or unitary assembly on the strut or oleo adjacent the wheel brake. The housing 130 is provided with a plurality of attaching bosses 130d adapted to be connected with the landing strut 130e through the medium of embracing straps 130f or their equivalent.

The low-pressure large volume cylinder 140 receives piston 142 therein for reciprocation by power applying motor 2D. Piston 142 is drivingly connected with the terminal of plunger 132b through a lost motion and makeup valve assembly 143. Piston 142 is formed with a central bore 142a through which extends a fluted portion 132e of plug 132d. A valve 143a is carried by plunger 132b for cooperation with seat 143b. Stop shoulder 130g defines the off position of piston 142. The central portion of housing 130 between motor 2D and low pressure generating piston 142 provides a sump or low pressure reservoir 130h in communication at all times with the makeup valve 143. Star spring 143c is so arranged that it absorbs any light shock between closure connecting plug 132d and piston 142 upon relative movement in the opening direction. It will appear that makeup valve 143 will be opened by relative movement between piston 142 and power plunger 132b at any time and at any position of piston 142 when the driving force from power applying piston 132a is relaxed, the makeup of fluid thus not being limited to the complete off position of piston 142 in contact with stop shoulder 130g.

The specific arrangement of pressure responsive switch assembly 112 does not form part of the claimed subject matter of the present invention, the same being covered by Holt, U. S. Patent 2,405,142. For the purpose of understanding the present invention, switch assembly 112 includes pressure responsive diaphragm 112a, pressure transmitting plunger 112b, switch body 112c pivotally supported at 112d, snap acting, switch contact supporting spring 112e contacted by plunger 112b, and telescoping threaded adjusting assembly 112f. Adjusting assembly 112f includes a spring operated plunger 112g contacting the underside of switch body 112c. This arrangement makes it possible to maintain a relatively small differential of pressure between selected levels while at the same time effecting positive and unfaltering operation of the control switch for electric motor 110f.

For an understanding of the operation of the arrangement of Figs. 2 to 5 reference is now made particularly to the schematic layout of Fig. 2. Operation of treadle 118 by the pilot causes master cylinder 118a to transmit a corresponding pressure to piston 117c of on-modulating valve 2B to piston 128a of transfer and off modulating valve 2C and to monitor plunger assembly 133b for acting on work sharing reaction surface Z. In the position of the elements shown, high pressure fluid from accumulator 113 stands in communication with the smaller one of the differential areas 2Y of motor 2D, the same having moved the motor to the complete off position. No pressure fluid is acting on the major or larger differential area 2X of the motor 2D. As soon as the pilot has transmitted a sufficient level of control pressure to piston 117c, then the same becomes effective to modulate pressure through on-modulating valve 2C to the upper major differential area 2X of motor 2D. This is accomplished by the shifting of tubular valve element 117 into contact with return valve portion 116b of on-modulating valve 116 to thus shut off communication with the low pressure return and subsequently open on-modulating valve proper 116 to an extent determined by the pressure applied by the pilot to treadle 118. This modulated pressure transmitted past valve seat 116a is delivered to the upper or major differential area 2X of the motor 2D. When the level of the pressure delivered to surface 2X has been raised to a sufficient value to overcome the full accumulator pressure acting on the opposed smaller area 2Y, then the motor plunger 132b starts moving outwardly. Attention is again directed to the fact that as leading surface 2Y displaces the high pressure fluid in contact therewith, this pressure fluid instead of being spilled into the low pressure return as in the case of currently available systems, is instead transferred back through open transfer valve 126, communicating passage 129a, on-modulating valve housing 115 about valve 116 and to the opposed major differential area 2X making up a considerable portion of the pressure fluid required to be delivered to area 2X. In other words, the transfer of pressure fluid from leading surface 2Y to trailing surface 2X reduces by a sizable amount the total volume of high pressure fluid from the accumulator consumed during the initial or first stage operation of motor 2D.

Movement of power plunger 132b first becomes effective to take up the slack in makeup valve 143 closing the same and driving the piston 142 of the low-pressure large-volume generator 2E, thus delivering a first level of operating pressure through relatively short conduit 141a to the expander tubes 141 effecting slack takeup and brake engagement, this being referred to as the "brake engaging stage."

With the slack taken up and the shoes in engagement with the drum 144, the treadle 118 offers additional opposition to movement by the pilot's foot and the application of further pressure by the pilot becomes effective on plunger 128a of transfer and off modulating valve 2C to move transfer valve 126 against the action of compression spring 127a, effecting the closing of transfer valve 126 and the shutting off of communication between the accumulator and leading surface 2Y of motor 2D. Further movement of piston 128a becomes effective to shift tubular valve element 127 and gradually open off modulating valve 127b, in proportion to the pressure exerted by the pilot on treadle 118. The opening of off modulating valve 127b is effective to off modulate the fluid pressure from communication with leading surface 2Y and spill or discharge the same into the low pressure return reservoir 130h. By the exertion of sufficient additional pressure on treadle 118, the pilot can effect complete opening of off modulating valve 127b, completely relieving leading surface 2Y from the action of pressure, thus rendering the entire surface 2X effective in response to the maximum pressure delivered thereto through on-modulating valve 116, and effecting the maximum application of fluid power to motor 2D and the consequent generation of maximum pressure by piston 142 delivering to the expander tubes 141 of the brake.

It will further appear that the pilot will maintain a feel or reaction indicating to him the extent to which the brakes are being applied. In other words, the pilot will feel the reaction on both valve operating plungers 117c and 128a. In addition, the pilot does an amount of work which bears a definite ratio to the total work involved since the pressure from the master cylinder 118a is delivered through the monitor plunger 130b to surface Z, the travelling of this surface Z also giving the pilot the desired pedal travel.

While I have described only one unit by way of example, it will be understood that a similar unit is contemplated for installation on each of the two principal forward landing wheel struts.

Turning now to still another modified system incorporating my invention, reference is had to Figs. 6 to 8. Referring first particularly to Fig. 6 showing schematically the essential portions of the layout, incorporating this modification, particular emphasis will be placed in the description on the features of difference. Instead of rendering the off modulating valve responsive to a selected level of accumulator pressure delivered to the primary motor surface as in the modification of Fig. 1, it will be noted that pressure responsive piston 228a, of motor 228 forming part of transfer and off modulating valve 3C, is rendered operable in response to the generation of a selected level of low pressure fluid in cylinder 240 of pressure generator 3E. Coil compression spring 232c functions to return motor piston 232a to off position as in the modification shown in Fig. 1, instead of returning the same by pressure as in the modification of Fig. 2.

Any suitable pressure generating and maintaining arrangement may be employed, such for example, as that shown in the modification of Fig. 2 or preferably an arrangement of the type disclosed in Rockwell Patent 2,197,772. Any desired on-modulating valve arrangement may be employed such, for example, as that disclosed in connection with the modifications of Figs. 1 and 2 or preferably that disclosed in Rockwell Patent 2,244,966, which is effective to give the optimum mode of modulated pressure delivery irrespective of the pressure level at which operation is desired, as well as being effective to give other desirable characteristics.

Referring in greater detail to Fig. 6, there is illustrated a motor 3D and low pressure large volume generator 3E, in a form particularly adapted for production including the transfer and off modulating valve 3C, the pressure fluid power applying motor 3D, the low pressure large volume generator 3E, and the low pressure return sump and makeup reservoir 230h, all in one unitary assembly, particularly adapted for installation on an airplane in a similar manner to that disclosed in connection with the modification of Figs. 2 to 5.

Transfer and off modulating valve assembly 3C is similar to the corresponding valve assembly in the previously described modifications, except as will be pointed out. Valve housing proper 225 is preferably formed as an integral part of motor housing 230 and is positioned in opposed relation to the lower terminal of motor cylinder 231. The inlet pressure from the pilot treadle master cylinder operated on-modulating valve (not shown) is directed through conduits 226b, tubular valve member 227, and passage 226c into the lower portion of motor cylinder 231 into contact with the smaller one of the differential piston areas 3Y, when the pilot operates the treadle. Spill passage 226d directs off modulated pressure from contact with surface 3Y through passage 226c and off modulating valve proper 227b in response to development or generation of a selected value of pressure within low pressure generator cylinder 240. Generation within cylinder 240 of the selected value of low pressure acts through control line 233 and off modulating valve motive piston 228a to effect the closing of transfer valve proper 226 and the opening of off modulating valve proper 227b to off modulate the pressure from contact with relatively small surface 3Y and thus render more effective the relatively large surface 3X. Spill passage 226d discharges into the sump or makeup reservoir 230h from which the low pressure fluid is subsequently picked up by conduits 210c and directed back to the fluid pressure generator inlet (not shown).

The power applying motor assembly 3D is generally similar to that of the modification of Figs. 2 through 4, except as will be pointed out. Motive piston assembly 232 includes a separable piston 232a and a plunger 232b having the inner end thereof closed, this piston portion being fastened in installed position by a snap ring and the necessary sealing rings employed to provide a seal, as indicated.

An air bleed valve assembly 232f is formed in the terminal of plunger 232b for the purpose of effectively ejecting any air that may have accumulated in the unit. This valve assembly includes a valve proper 232g for controlling communication between the two faces of piston 232a, this valve being normally urged in the direction of closed position by compression spring 232h. Spider member 232j is mounted in the upper portion of cylinder 231 and is effective when piston 232a is moved into the retracted position thereof to open valve 232g against its operating spring 232h. Compression spring 232c functions to return the motor assembly to off or retracted position upon the release of pressure from acting on motive piston 232a.

Low pressure, large volume generating piston 242 is generally similar to that of the modification of Figs. 2 through 5, except as will be pointed out. Instead of a fluted closure plug in the lower terminal of plunger 232b, this modification includes the return spring 232c passing up through the lower portion of plunger 232b engaging the closed terminal portion thereof, this spring being spaced from the plunger by perforated sleeve 243d allowing the free passage through radial ports 232e of the necessary makeup fluid pressure required in cylinder 240. Conical shaped valve 243a is formed on the outer periphery of plunger 232b above radial ports 232e and cooperates with a seat 243b and piston 242 to control the flow of fluid through radial passages 232e.

It will thus appear that this modification differs principally from so-called de-booster valve cylinders in current use by the incorporation of my high pressure fluid conserving feature wherein transfer and off modulating valve 3C is employed in connection with differential pressure areas 3X and 3Y to automatically provide two-stage operation.

Referring now to Figs. 7 and 8, several curves have been plotted based on actual and calculated data which curves bring out quite clearly the improved efficiency and important saving of high pressure fluid by employing my invention.

Referring first to Fig. 7, brake pressures have been plotted against volume of pressure fluid consumed in expanding the brake tubes of a commercial brake expander tube assembly, this data having been taken both when the brakes were new and after the same had become considerably worn. It is readily apparent that with this type of brake the volume of fluid required rises rapidly as the brake assembly becomes worn.

Turning now to Fig. 8, test data was first recorded for the same construction operating in the manner in current practice, with the conserving feature out of operation, namely, leaving out the operation of transfer and off modulating valve 3C with no delivery of pressure to surface 3Y. The upper dotted line curve shows the result of this operation, high pressure fluid input to the work applying motor cylinder in contact with surface 3X being plotted against low pressure fluid output from cylinder 240 to the expander tubes of the brake.

Next, data was calculated for an operation of structure conforming with the disclosure of Fig. 6, fluid pressure being delivered to motive piston surfaces 3X and 3Y through transfer valve 226 during the first stage of operation followed by the automatic operation of off modulating valve 227b in response to the development of a selected value of pressure in the cylinder 240 effective to off modulate pressure fluid from surface 3Y to the low pressure reservoir 230h. The data obtained is incorporated into the solid line curve below the above described dotted line curve in Fig. 8. The cross-hatched area between these two curves indicates quite clearly a major saving in the total volume of high pressure fluid consumed by employing my invention.

While I have described my invention in connection with certain specific embodiments thereof, it is to be understood that this is by way of example only and that my invention is to be defined by the appended claims.

I claim:

1. In combination with an aircraft landing strut which includes a wheel brake having brake expander tubes adapted to receive a relatively large volume of low pressure fluid through a short fluid link; those improvements which include a packaged power unit comprising means defining a housing attached to the landing strut closely adjacent a brake expander tube, said housing incorporating a hydraulic pressure fluid power applying piston assembly, means defining a low pressure large volume pressure generating piston assembly, means drivingly connecting said power applying piston assembly and said low pressure generating piston assembly, means defining a fluid pressure generator, means defining an electric motor driving said generator, means defining a fluid pressure accumulator receiving pressure from said generator, said power piston assembly including a pair of opposed differential pressure responsive surfaces including a relatively large major trailing surface and a relatively small leading surface, means for normally delivering pressure from said accumulator to said leading surface for effecting retracting movement of said power applying piston assembly, means defining an on-modulating valve assembly, effective when operated to deliver modulated pressure to said relatively large trailing differential surface for overcoming the opposing action of accumulator pressure acting on said leading differential surface, said means effective to normally deliver accumulator pressure to said leading surface comprising a transfer and off modulating valve assembly, including a transfer valve portion effective when open to pass accumulator pressure to said leading one of said surfaces and further effective upon initial operation of said power applying piston assembly to transfer pressure fluid from said leading surface back through said transfer valve to the trailing major one of said differential areas to thus make up a portion of the total pressure fluid delivered to said major surface, means defining a remote manually controllable pressure control line, said on-modulating valve assembly further including pressure responsive motive means for operating the same, said transfer and off modulating valve assembly further including pressure responsive motive means for operating the same, both of said last-named motive means being under the control of said manually controllable pressure control line.

2. In combination with an aircraft landing strut which includes a wheel brake having brake expander tubes adapted to receive a relatively large volume of low pressure fluid through a short fluid link; those improvements which include a packaged power unit comprising means defining a housing attached to the landing strut in close proximity to a brake expander tube, said housing incorporating a hydraulic pressure fluid power applying piston assembly, a low pressure large volume pressure generating piston assembly, means drivingly connecting said power applying piston assembly and said low pressure generating piston assembly, means defining a low pressure return fluid reservoir in communication with said connecting means between said power piston and said generating piston, said connecting means further including a lost motion operable low pressure fluid makeup valve, means defining a fluid pressure generator, an electric motor for driving said generator, means defining a pressure fluid accumulator receiving pressure fluid from said generator, said power piston assembly further including a pair of opposed differential pressure responsive surfaces comprising a first major surface trailing in the on direction of operation and a smaller minor surface leading in the direction of on operation, means for delivering pressure fluid from said accumulator to said respective surfaces including a first transfer and off modulating valve assembly effective in the normal position thereof to deliver accumulator pressure to said minor one of said differential surfaces and being further effective upon the operation of said power piston assembly to transfer pressure fluid from said minor surface to said major surface to thus make up a portion of the pressure fluid delivered to said major surface, thus conserving the total pressure fluid consumed, means defining an on-modulating valve assembly, effective to deliver modulated pressure fluid from said accumulator to said major one of said surfaces, means defining a remote manually operable control line, said on-modulating valve assembly comprising pressure responsive motive means for operating the same, both of said valve pressure responsive motive means being operable by said manually operable control line, said transfer and off modulating valve motive means being operable in responsive to a selected relatively high pressure in said control line whereby pressure fluid is first delivered to both said major and said minor surfaces for producing a first or engaging stage of operation followed by the operation of said transfer valve to closed position and the further operation thereof to off modulate the pressure fluid from said minor surface to thus provide a second or squeeze stage of operation.

3. In combination with an aircraft landing strut which includes a wheel brake having brake expander tubes adapted to receive a relatively large volume of low pressure fluid through a short fluid link; those improvements which include a packaged power unit comprising means defining a housing attached to a landing strut adjacent a brake expander tube, said housing incorporating a hydraulic pressure fluid power applying piston assembly, a low pressure large volume pressure generating piston, means drivingly connecting said power applying piston and low pressure generating piston, an electric motor incorporated within said housing, a fluid pressure generator incorporated within said housing driven by said electric motor, a fluid pressure accumulator incorporated within said housing and receiving pressure from said generator, a low pressure return fluid reservoir incorporated within said housing supplied by said generator, said power piston assembly including a pair of opposed differential pressure responsive surfaces, means for delivering pressure from said accumulator to said surfaces including a modulating valve assembly effective in one position thereof to deliver pressure to both of said areas, the difference in the areas of said surfaces being effective to cause movement of said power piston to drive said pressure transforming piston to generate and deliver a relatively low pressure fluid adapted to operate a brake expander tube for producing the "engaging stage," said valve assembly being effective during said "engaging stage" to cause the transfer of high pressure fluid from the leading one of said power piston surfaces to the trailing one of said surfaces to thus limit the total volume of high pressure fluid consumed during said "engaging stage" to the product of the difference in said surface areas multiplied by the distance of travel of said power piston, said modulating valve assembly being additionally operable following said "engaging stage" to cut off communication of said high pressure fluid with said leading power piston surface and effective to off modulate the said fluid pressure from contact with said leading surface back to said reservoir to thus render the pressure in contact with said power piston trailing surface fully effective for applying a greater force to said transforming piston to cause the same to deliver an intensified pressure for accomplishing the "squeeze stage" of operation, said modulating valve assembly including pressure responsive means for effecting said sequence of operation and manually controlled means for applying said control pressure from a remote position in accordance with the brake application desired, said connecting means between said power piston and said pressure transforming piston passing through said low pressure return reservoir and including valve means responsive to the relative movement of said pistons for placing the leading surface of said transforming piston in communication with said low pressure reservoir for making up any deficiency in the fluid link between said piston and said expander tubes.

4. In combination with an aircraft landing strut which includes a wheel brake having brake expander tubes adapted to receive a relatively large volume of low pressure fluid through a short fluid link; those improvements which include a packaged power unit comprising means defining a housing attached to the landing strut adjacent a brake expander tube, said housing incorporating a hydraulic pressure fluid power applying piston assembly, a low pressure large volume pressure generating piston assembly within said housing, means connecting said power applying piston assembly and said low pressure generating piston assembly and conduit means adapted to connect said low pressure generating piston assembly with an expander tube of an aircraft brake.

5. In a self-contained electric hydraulic power unit adapted for the operation of brakes, having a connection leading to a remote manually controlled master cylinder, and a hydraulic connection to a hydraulic motor which is adapted for the actuation of brakes, those improvements which comprise a housing means comprising a fluid supply reservoir and an accumulator, a pump located within the housing means having an inlet port leading to the supply reservoir and a check valve between the pump and the accumulator located within the housing means, and a modulator valve assembly including master cylinder pressure responsive plunger means and valve means, adapted to receive fluid from the accumulator for the operation of brakes and to discharge fluid into the supply reservoir upon release of the brakes, and a piston means associated with the output connection to the brakes, having a travel-coordinating device cooperating with a valve operating plunger to effect an increasing pressure with the increased travel thereof and adapted to be connected to the master cylinder by said first manual connection, and a pressure-operated switch on the housing means for controlling the electric motor so as to maintain a substantially uniform level of pressure fluid for the operation of the brakes, the elements herein specified, with the exception of the master cylinder connections and motor, being arranged in a unitary structure for unit handling and assembly.

EDWARD A. ROCKWELL.

REFERENCES CITED

The following references are of record in the file of this patent:

UNITED STATES PATENTS

| Number | Name | Date |
|---|---|---|
| 433,822 | Robb | Aug. 5, 1890 |
| 523,419 | Thorpe | July 24, 1894 |
| 1,846,089 | Davis | Feb. 23, 1932 |
| 2,009,515 | Pardee | July 30, 1935 |
| 2,029,096 | Doyle | Jan. 28, 1936 |
| 2,136,638 | Rockwell | Nov. 15, 1938 |
| 2,142,628 | Ballert | Jan. 3, 1939 |
| 2,163,627 | Peterson | June 27, 1939 |
| 2,296,145 | Christensen | Sept. 15, 1942 |
| 2,322,063 | Schnell | June 15, 1943 |
| 2,328,637 | Freeman | Sept. 17, 1943 |
| 2,329,709 | Fischer | Sept. 21, 1943 |
| 2,345,165 | White | Mar. 28, 1944 |
| 2,352,344 | Rockwell | June 27, 1944 |
| 2,356,366 | Wise | Aug. 22, 1944 |

FOREIGN PATENTS

| Number | Country | Date |
|---|---|---|
| 43 | Great Britain | 1893 |
| 447,829 | Great Britain | May 19, 1936 |